(12) United States Patent
Wang et al.

(10) Patent No.: US 7,576,528 B2
(45) Date of Patent: Aug. 18, 2009

(54) CONTROL CIRCUIT RESPONSIVE TO AN IMPEDANCE

(75) Inventors: Zhao-Jun Wang, San Jose, CA (US); Stefan Bäurle, San Jose, CA (US); David Michael Hugh Matthews, Sunnyvale, CA (US)

(73) Assignee: Power Integrations, Inc., San Jose, CA (US)

( * ) Notice: Subject to any disclaimer, the term of this patent is extended or adjusted under 35 U.S.C. 154(b) by 329 days.

(21) Appl. No.: 11/543,506

(22) Filed: Oct. 4, 2006

(65) Prior Publication Data
US 2008/0084712 A1      Apr. 10, 2008

(51) Int. Cl.
*G05F 1/00* (2006.01)
(52) U.S. Cl. ...................................... 323/284
(58) Field of Classification Search ................ 323/284; 361/91.2, 91.3; 363/123
See application file for complete search history.

(56) References Cited

U.S. PATENT DOCUMENTS

| | | | |
|---|---|---|---|
| 5,014,178 A | 5/1991 | Blakrishnan | |
| 5,038,053 A | 8/1991 | Djenguerian et al. | |
| 5,045,800 A | 9/1991 | Kung | |
| 5,274,274 A | 12/1993 | Leman et al. | |
| 5,282,107 A | 1/1994 | Balakrishnan | |
| 5,285,369 A | 2/1994 | Balakrishnan | |
| 5,313,381 A | 5/1994 | Balakrishnan | |
| 5,581,173 A * | 12/1996 | Yalla et al. | 323/257 |
| 5,773,978 A * | 6/1998 | Becker | 324/430 |
| 6,107,851 A | 8/2000 | Balakrishnan et al. | |
| 6,147,883 A | 11/2000 | Balakrishnan et al. | |
| 6,154,377 A | 11/2000 | Balakrishnan et al. | |
| 6,212,079 B1 | 4/2001 | Balakrishnan et al. | |
| 6,226,190 B1 | 5/2001 | Balakrishnan et al. | |
| 6,229,366 B1 | 5/2001 | Balakrishnan et al. | |
| 6,249,876 B1 | 6/2001 | Balakrishnan et al. | |
| 6,297,623 B1 | 10/2001 | Balakrishnan et al. | |
| 6,304,462 B1 | 10/2001 | Balakrishnan et al. | |
| 6,313,976 B1 | 11/2001 | Balakrishnan et al. | |
| 6,337,788 B1 | 1/2002 | Balakrishnan et al. | |
| 6,351,398 B1 | 2/2002 | Balakrishnan et al. | |
| 6,356,464 B1 | 3/2002 | Balakrishnan et al. | |
| 6,362,981 B1 | 3/2002 | Balakrishnan et al. | |
| 6,366,481 B1 | 4/2002 | Balakrishnan et al. | |

(Continued)

OTHER PUBLICATIONS

Balakrishnan, U.S. Appl. No. 60/275,962, filed Mar. 14, 2001.

(Continued)

*Primary Examiner*—Shawn Riley
(74) *Attorney, Agent, or Firm*—Blakely Sokoloff Taylor & Zafman LLP

(57) ABSTRACT

A power supply controller measuring impedance includes a sense circuit coupled to a sense terminal. A regulation circuit is coupled to the sense circuit and is also coupled to regulate the sense terminal to a first voltage level when a current flowing through the sense terminal is less than a first threshold current level. The regulation circuit is further coupled to regulate the sense terminal to a second voltage level when the current flowing through the sense terminal reaches the first threshold current level. A response circuit is coupled to the sense circuit and is responsive to the current flowing through the sense terminal when the sense terminal is regulated at the second voltage level.

30 Claims, 11 Drawing Sheets

U.S. PATENT DOCUMENTS

| | | |
|---|---|---|
| 6,388,853 B1 | 5/2002 | Balakrishnan et al. |
| 6,414,471 B1 | 7/2002 | Balakrishnan et al. |
| 6,438,003 B1 | 8/2002 | Balakrishnan et al. |
| 6,456,475 B1 | 9/2002 | Balakrishnan et al. |
| 6,462,971 B1 | 10/2002 | Balakrishnan et al. |
| 6,525,514 B1 | 2/2003 | Balakrishnan et al. |
| 6,538,908 B2 | 3/2003 | Balakrishnan et al. |
| 6,580,593 B2 | 6/2003 | Balakrishnan |
| 6,580,622 B2 | 6/2003 | Balakrishnan et al. |
| 6,608,471 B2 | 8/2003 | Balakrishnan et al. |
| 6,643,153 B2 | 11/2003 | Balakrishnan et al. |
| 6,667,605 B2 | 12/2003 | Balakrishnan et al. |
| 6,687,101 B2 | 2/2004 | Balakrishnan et al. |
| 6,744,645 B2 | 6/2004 | Balakrishnan et al. |
| 6,747,443 B2 | 6/2004 | Balakrishnan et al. |
| 6,747,444 B2 | 6/2004 | Balakrishnan et al. |
| 6,750,640 B2 | 6/2004 | Balakrishnan et al. |
| 6,781,357 B2 | 8/2004 | Balakrishnan et al. |
| 6,784,646 B2 | 8/2004 | Balakrishnan et al. |
| 6,788,514 B2 | 9/2004 | Balakrishnan |
| 6,833,692 B2 | 12/2004 | Balakrishnan et al. |
| 6,876,181 B1 | 4/2005 | Balakrishnan et al. |
| 6,882,134 B2 | 4/2005 | Balakrishnan et al. |
| 6,900,622 B2 | 5/2005 | Balakrishnan et al. |
| 6,914,793 B2 | 7/2005 | Balakrishnan et al. |
| 6,954,057 B2 | 10/2005 | Balakrishnan et al. |
| 6,967,472 B2 | 11/2005 | Balakrishnan et al. |
| 6,992,471 B2 | 1/2006 | Balakrishnan et al. |
| 7,034,625 B2 | 4/2006 | Pham |
| 7,038,439 B2 | 5/2006 | Balakrishnan et al. |
| 7,045,994 B2 | 5/2006 | Balakrishnan et al. |
| 7,061,301 B2 | 6/2006 | Pham |
| 7,068,022 B2 | 6/2006 | Balakrishnan |
| 7,091,752 B2 | 8/2006 | Balakrishnan |
| 7,099,128 B2 | 8/2006 | Balakrishnan et al. |
| 7,109,696 B2 | 9/2006 | Balakrishnan et al. |
| 7,110,270 B2 | 9/2006 | Balakrishnan et al. |
| 2004/0195976 A1 | 10/2004 | Balakrishnan et al. |
| 2004/0212942 A1 | 10/2004 | Balakrishnan |
| 2005/0073785 A1 | 4/2005 | Djenguerian et al. |
| 2005/0152164 A1 | 7/2005 | Balakrishnan et al. |
| 2005/0200395 A1 | 9/2005 | Pham |
| 2006/0028190 A1 | 2/2006 | Balakrishnan et al. |
| 2006/0053319 A1 | 3/2006 | Balakrishnan et al. |
| 2006/0098463 A1 | 5/2006 | Bäurle et al. |
| 2006/0139111 A1 | 6/2006 | Pham |
| 2006/0158909 A1 | 7/2006 | Hawley |
| 2006/0176039 A1 | 8/2006 | Balakrishnan |
| 2006/0176716 A1 | 8/2006 | Balakrishnan et al. |
| 2006/0181253 A1 | 8/2006 | Balakrishnan et al. |
| 2006/0192540 A1 | 8/2006 | Balakrishnan et al. |

OTHER PUBLICATIONS

Balakrishnan et al., U.S. Appl. No. 60/316,583, filed Aug. 31, 2001.
Balakrishnan et al., U.S. Appl. No. 60/325,642, filed Sep. 27, 2001.
Balakrishnan et al., U.S. Appl. No. 60/335,158, filed Nov. 13, 2001.
Balakrishnan et al., U.S. Appl. No. 60/350,158, filed Jan. 17, 2002.
Bäurle et al., U.S. Appl. No. 11/174,183, filed Jul. 1, 2005.
Bäurle et al., U.S. Appl. No. 11/178,132, filed Jul. 7, 2005.
Djenguerian et al., U.S. Appl. No. 11/177,091, filed Jul. 8, 2005.
Kroes, U.S. Appl. No. 11/177,096, filed Jul. 8, 2005.
Park et al., U.S. Appl. No. 11,177,124, filed Jul. 8, 2005.
Djenguerian et al., U.S. Appl. No. 11/179,144, filed Jul. 11, 2005.
Matthews et al., U.S. Appl. No. 11/213,252, filed Aug. 26, 2005.
Djenguerian, U.S. Appl. No. 11/213,296, filed Aug. 26, 2005.
Bailey et al., U.S. Appl. No. 11/311,957, filed Dec. 19, 2005.
Pham, U.S. Appl. No. 11/433,256, filed May 5, 2006.
Balakrishnan, U.S. Appl. No. 11/474,163, filed Jun. 23, 2006.
Balakrishnan et al., U.S. Appl. No. 11/485,548, filed Jul. 11, 2006.
Wang, U.S. Appl. No. 11/493,504, filed Jul. 25, 2006.
Balakrishnan et al., U.S. Appl. No. 11/503,448, filed Aug. 11, 2006.

* cited by examiner

CONTROL CIRCUIT RESPONSIVE TO AN IMPEDANCE

BACKGROUND INFORMATION

1. Field of the Disclosure

The present invention relates generally to control circuits, and more specifically, the present invention relates to control circuits that are responsive to an impedance at a control circuit terminal.

2. Background

Integrated circuits may be used for a multitude of purposes and applications. Many applications have cost goals that limit the functionality of the integrated circuit in order to meet these goals. The package in which the integrated circuit is housed can significantly contribute to its cost. The number of pins or terminals that it uses in turn influences the cost of the integrated circuit package. The number of pins that can be used to meet cost goals therefore often limits the number of features or options that can be provided to customers using an integrated circuit.

An example of this can be appreciated with respect to an over-voltage protection feature commonly provided by control circuits used in power conversion applications. Depending on the customer, the desired response to an over-voltage fault condition may be for the power converter to stop operating and require the power converter to be reset by, for example, removing and reapplying the input voltage before the power converter starts to operate again. In other cases a customer may wish the response to an over-voltage condition to be an automatic restart after a shutdown period, an operation often referred to as auto-restart.

In order to provide customers with these different responses to the same operating condition, it is often necessary to manufacture two versions of the same integrated circuit with the response to an over-voltage condition as the only difference. This introduces additional manufacturing costs and overhead associated with holding inventory of two integrated circuit types with a single distinguishing feature. Alternatively the same integrated circuit could have multiple separate terminals to accommodate the various responses to an operating condition, which increases the cost of the package used to house the integrated circuit.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples of apparatuses and methods for implementing a control circuit responsive to an impedance at a control circuit terminal are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined for example into any suitable combinations and/or sub-combinations in one or more embodiments.

A control circuit responsive to an impedance at a control circuit terminal in accordance with the teachings of the present invention will now be described. Embodiments of the present invention involve methods and apparatuses to generate control circuits responsive to impedances at control circuit terminals.

Figure 1:
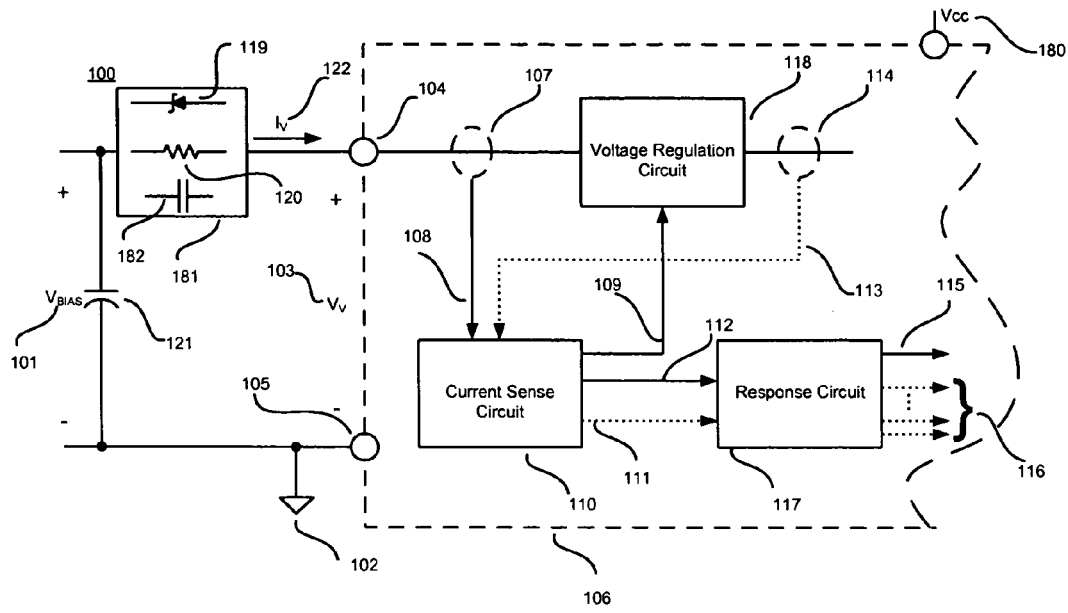
FIG. 1 is a block diagram illustrating generally an example of a portion of a controller coupled to receive a current flowing through a sense terminal of the controller with an example of a current sense circuit sensing a magnitude of the current in accordance with the teachings of the present invention.

FIG. 1 shows generally an example block diagram of a control circuit being a portion of a controller in accordance with the teachings of the present invention. Current sense circuit 110 senses the magnitude of a current 122 flowing in a sense terminal 104. In another example, the direction or polarity of current 122 through terminal 104 could be reversed in accordance with the teachings of the present invention. As shown in the example, current 122 can be sensed at either side, 107 or 114, of voltage regulation circuit 118. Depending on which side 107 or 114 that current 122 is sensed, a current sense signal 108 or 113 is provided to current sense circuit 110.

In the example, voltage regulation circuit 118 regulates the voltage $V_V$ 103 between the sense terminal 104 and reference potential 102, which in this example is coupled to the controller 106 ground potential terminal 105. In the example of FIG. 1 voltage regulation circuit 118 is a series regulator circuit. In another example, a shunt regulator circuit configuration could be used in accordance with the teachings of the present invention. In the example, the sense terminal voltage 103 is regulated to a first voltage level when the magnitude of the current 122 flowing through the terminal 104 is below a first threshold value.

As shown, coupled between sense terminal 104 and an external bias voltage $V_{BIAS}$ 101, is an impedance block 181. In various examples, impedance block 181 could include a resistor 120, Zener diode 119, capacitor 182 or some combination thereof to make up an impedance coupled between sense pin 104 and the source of external bias voltage 101 in accordance with the teachings of the present invention. Impedance block 181 could also include an inductor, though as this is thought to be less likely for practical reasons associated with the low frequency impedance of low cost inductors, this is not considered further. The choice of external impedance will be discussed in more detail with reference to FIG. 2.

In an example where impedance block 181 comprises a resistor 120, if $V_{BIAS}$ 101 voltage increases, the current 122 flowing in resistor 120 also increases. If the magnitude of the current flowing through terminal 104 reaches a first threshold current level, the value of which is determined by the design of current sense circuit 110, a signal 109 is provided to the voltage regulation circuit 118, which sets a second voltage regulation level. This second voltage regulation level can be higher or lower than the first regulation voltage level. When the voltage $V_V$ 103 has settled at the second voltage regulation level, the current 122 is again sensed by current sense circuit 110. The magnitude of the current 122 flowing through terminal 104 at the second voltage regulation level determines the output signal 112 of current sense circuit 110 and therefore the output of the response circuit 117.

In one example, if the second voltage regulation level is lower than the first voltage regulation level, and if the magnitude of current 122 at the second voltage regulation level is greater than a second threshold current level, this could indicate that a Zener diode 119 is coupled to the sense terminal 104 instead of the resistor 120, since the slope or dynamic impedance of Zener diodes is very low once the rated Zener voltage has been reached. If however, at the second voltage regulation level, the magnitude of current 122 does not exceed a second current threshold level, this could indicate that a resistor 120 is used instead of the Zener diode 119. The above description assumes that the resistor 120 impedance is much higher than the Zener diode 119 slope impedance.

The response of the response circuit 117 can be for example to cause the controller 106 to shutdown indefinitely, or latch off, if the current 122 at the second voltage regulation level is greater than the second current threshold level for at least a measurement delay period. If the magnitude of current 122 does not exceed the second current threshold level when voltage $V_V$ 103 is regulated at the second voltage regulation level, then the response of the response circuit 117 can be for example to cause the controller 106 to shutdown only for a short period and then restart automatically.

In the case of a latch off condition, in one example, controller 106 is shutdown indefinitely until a power supply voltage at a Vcc terminal 180 providing power to the controller 106 is allowed to fall below a reset threshold level in order to reset the controller 106 and allow a restart when the power supply voltage is reintroduced. In one example, where controller 106 is used in an AC/DC power converter circuit, the power supply voltage to the controller 106 could be allowed to go below the threshold to reset the controller 106 by removing the AC input voltage to the power converter for a period of time in accordance with the teachings of the present invention. In one example, reset of the controller 106 could be achieved without needing to allow the voltage at the Vcc terminal 180 to fall below a reset threshold level and instead another terminal of the controller 106 could be used to reset the controller 106 operation.

In one example, the source of $V_{BIAS}$ 101 voltage could be a transformer bias winding in a power converter circuit. A rise in a bias winding voltage could indicate a fault condition in the power converter operation. It is therefore of great benefit to the user of a controller 106 to program the response of the controller circuit to this type of fault condition. In other examples the operating condition to which a response is generated need not be a fault condition but could be any other operating condition where a response needs to be generated. In one example the operating condition could be an external shutdown signal applied to a controller, where for example the response could be to shutdown until the controller is reset or automatically restart the controller after a fixed shutdown period. For the purposes of the following description, an example of a fault condition is used.

Figure 2:
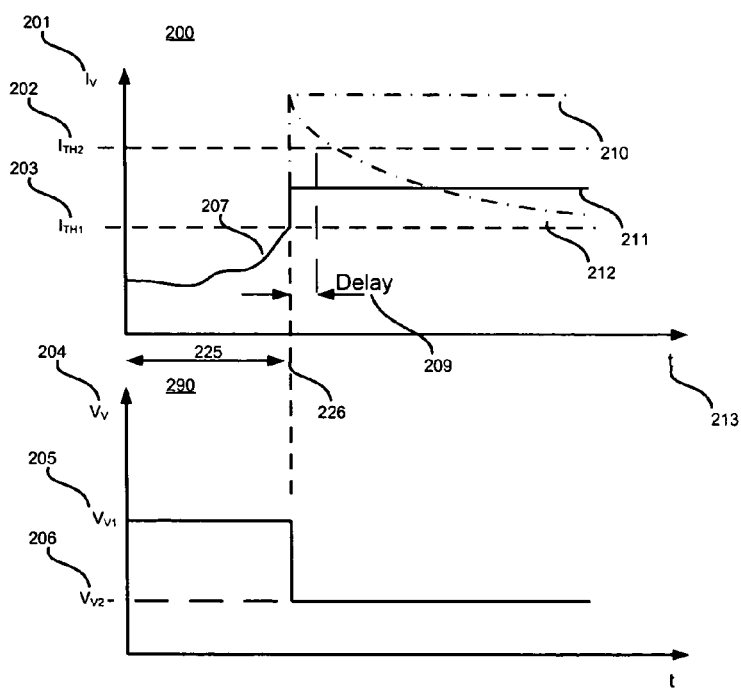
FIG. 2 shows generally examples of waveforms of current and voltage at a sense terminal in accordance with the teachings of the present invention.

FIG. 2 illustrates generally example waveforms in support of the description above. The waveforms of plot 200 show the variation of $I_V$ 201 with time t 213. The waveform of plot 290 shows the variation of $V_V$ 204 with time t 213. As shown, for a first period 225, $I_V$ 207 is below a first threshold level $I_{TH1}$ 203. For period 225, $V_V$ 204 is regulated at first voltage level $V_{V1}$ 205.

At time 226, $I_V$ reaches the first threshold level $I_{TH1}$ 203 and $V_V$ 204 is then regulated at a second voltage level $V_{V2}$ 206. In the example shown, $V_V$ 204 is regulated at the second voltage level substantially immediately $I_V$ reaches the first threshold level $I_{TH1}$ 203. In another example, the sense terminal could be regulated to the second voltage level a delay period after the current flowing through the sense terminal reaches the first threshold current level $I_{TH1}$ 203. In one example $I_V$ 201 rises to a new level 211 that is below a second threshold level $I_{TH2}$ 202 indicating that a resistive impedance 120 in FIG. 1 is included in impedance block 181 and coupled to sense terminal 104. In another example $I_V$ 201 rises to a higher new level 210 that is above a second threshold level $I_{TH2}$ 202, which indicates that a much lower impedance, such as for example Zener 119, is included in impedance block 181 and coupled to sense terminal 104 in FIG. 1. In the example, voltage levels $V_{V1}$ 205 and $V_{V2}$ 206 are substantially constant. In another example, voltage levels $V_{V1}$ 205 and $V_{V2}$ 206 will vary slightly according the value of the magnitude of current $I_V$ 122 flowing through sense terminal 104. Signal 212 in FIG. 2 shows one possible practical characteristic of $I_V$ 201 over time when the second voltage regulation level $V_{V2}$ 206 is set. In one example the reason for this type of characteristic could be that controller 106 is a power converter controller where response circuit 117 in FIG. 1 has generated an output signal 115 in response to an initial response signal 111, as soon as $I_{TH1}$ 203 is exceeded, that will cease the operation of the controller 106, which in turn ceases operation of the power converter in which it is used. Initial response signal 111, if used, is therefore applied regardless of the impedance of the impedance block 181 coupled to sense terminal 104 and is therefore not dependent on the impedance coupled to sense terminal 104. If controller 106 ceases operation, in a power converter circuit, capacitor 121 in FIG. 1 will start to discharge. The value of $I_V$ will therefore begin to fall as illustrated by curve 212 in FIG. 2. In a practical implementation, a delay period 209 may be included to ensure immunity to noise before the response circuit 117 commands an indefinite shutdown, or latching off, of controller 106. It is therefore important to ensure that capacitor 121 is large enough to maintain a value of $I_V$ 201 greater than second threshold $I_{TH2}$ 202, to allow response circuit 117 to provide the correct output signal 115 at the end of measurement delay period 209 in accordance with the teachings of the present invention.

The operation described above allows the controller 106 to sense or measure an impedance coupled to the sense terminal 104 when a magnitude of the current flowing through terminal 104 exceeds a threshold value. The response generated by the control circuit is therefore dependent on the value of the impedance coupled to the sense terminal in accordance with the teachings of the present invention.

In the example of FIG. 1 a single component, either 120 or 119, is included in impedance block 181 and coupled to sense terminal 104. However in other examples, the impedance coupled to the sense terminal 104 could be made up of more than one component. In that case, the power supply controller response would be responsive to or dependent on the impedance of the complete circuit of impedance block 181 coupled to the sense terminal 104 in accordance with the teachings of the present invention.

As described above, in one example, current sense circuit 110 couples a second signal 111 to response circuit 117 as an indication for example that the first current threshold $I_{TH1}$ has been exceeded and that a second phase of detecting an impedance coupled to the sense terminal 104 is starting. In one example this second signal 111 could generate an initial response from circuit 117, which is independent of the impedance of the circuit coupled to terminal 104. In one example where controller 106 is a power converter controller, the initial response could be to cease energy transfer to an output of the power converter to ensure the power converter is protected immediately when a fault condition is indicated by the fact that the first current threshold $I_{TH1}$ has been exceeded. In one example, this initial response signal 111 would then be followed by signal 112 coupling to response circuit 117 to determine the final response to the fault condition in accordance with the teachings of the present invention.

The examples described above have been limited to a single second current threshold level $I_{TH2}$. However, in one example one or more additional current sense levels could be sensed by current sense circuit 110 to generate a plurality of response circuit outputs as illustrated with the plurality of response outputs 116 in FIG. 1.

The examples described above have been limited to a single second voltage regulation voltage level $V_{V2}$ 206. However, in one example, when the current 122 flowing through the sense terminal 104 exceeds a first threshold, a plurality of voltage levels can be implemented which in one example can be alternating voltage levels to provide an alternating voltage level over time at sense terminal 104. The presence of an alternating voltage level at sense terminal 104 provides the capability to also detect for example a capacitive external impedance 182 coupled to sense terminal 104. In general, a capacitive impedance sensing scheme of this type would be more complex to implement and in the alternative embodiments discussed below, sensing of capacitive impedances is therefore not discussed. It is however understood that the general principle can be applied to any of the embodiments discussed below. It is therefore understood that in one example, sensing the impedance coupled to the sense terminal comprises detecting current flowing through the sense terminal at a plurality of voltage levels on the sense terminal.

Figure 3:
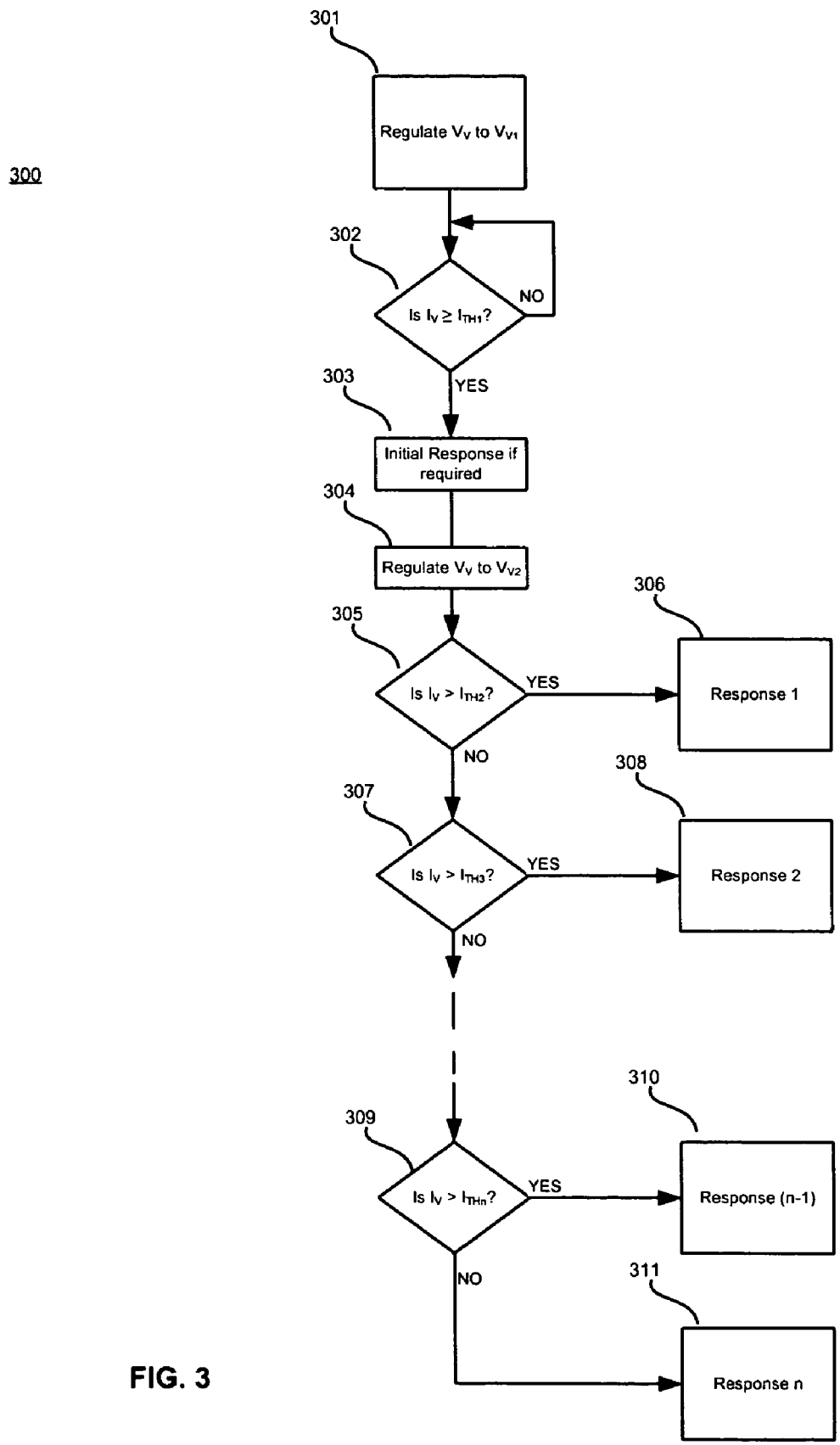
FIG. 3 shows generally an example of a flowchart for a controller responsive to an impedance coupled to a controller circuit terminal in accordance with the teachings of the present invention.

FIG. 3 shows generally an example flowchart of the operation of an example controller in accordance with the teachings of the present invention. In block 301, $V_V$ is regulated to the first regulation voltage level $V_{V1}$. In block 302 the current flowing through the sense terminal, $I_V$, is monitored to establish whether it has reached a first threshold value, $I_{TH1}$. If the current flowing through the sense terminal, $I_V$, reaches $I_{TH1}$, in block 303 an initial response is implemented if required by the application of the controller. In block 304, $V_V$ is regulated to a second voltage level $V_{V2}$. In block 305, $I_V$ is compared to a second current threshold value $I_{TH2}$. If $I_V$ reaches $I_{TH2}$, block 306 generates a response.

In the example flowchart shown in FIG. 3, a plurality of sense terminal threshold current levels are used to compare to the current flowing in the sense terminal as illustrated in blocks 307 and 309. Where, in block 309, $I_V$ is compared to an nth threshold current value $I_{THn}$ generating one of response (n−1) or response n in blocks 310 and 311 respectively. In the flowchart of FIG. 3, the plurality of sense terminal threshold levels are compared to the current flowing in the sense terminal sequentially. It is understood that in a circuit implementation, the comparisons could be made simultaneously.

Although not shown so as not to obscure the teachings of the present invention, it is also possible in an example to use a plurality of voltage regulation thresholds to monitor the change in current flowing in the sense terminal with each. In this way, the impedance of the circuit coupled to the sense terminal could be characterized over a number of different voltage regulation thresholds in accordance with the teachings of the present invention.

Figure 4:
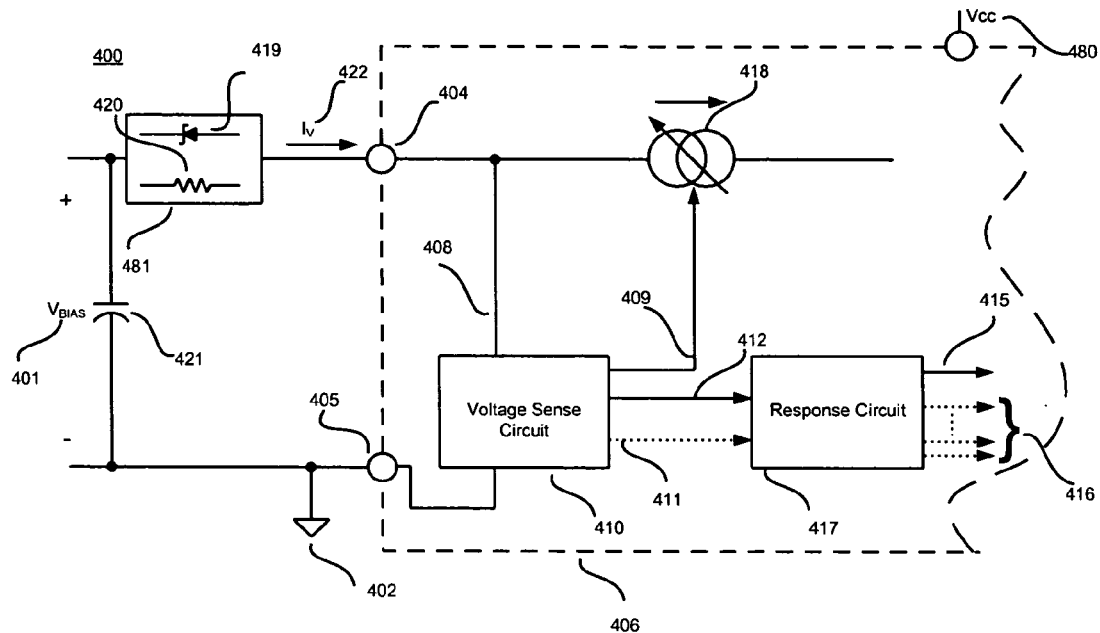
FIG. 4 is a block diagram illustrating generally an example of a portion of a controller coupled to receive a voltage at a sense terminal of the controller with an example voltage sense circuit sensing the value of a voltage between the sense terminal and a reference potential in accordance with the teachings of the present invention.

FIG. 4 shows generally a block diagram of an example control circuit being a portion of a controller in accordance with the teachings of the present invention. In the example, voltage sense circuit 410 senses the magnitude of a voltage, $V_V$ 403, between sense terminal 404 and reference potential terminal 405. Current 422 is regulated to a first current value determined by variable current source 418, when voltage $V_V$ 403 is below a threshold value and a second value determined by variable current source 418, when voltage $V_V$ 403 reaches the threshold value. Coupled between sense terminal 404 and an external bias voltage $V_{BIAS}$ 401, is an impedance block 481. In various examples, impedance block 481 could include for example a resistor 420, a Zener diode 419 or some combination thereof to make up an impedance coupled between sense pin 404 and the source of external bias voltage 401.

In one example, variable current source 418 conducts a first value of substantially zero current when voltage $V_V$ is below the first threshold voltage value such that $I_V$ 422 is also substantially equal to zero. Under these conditions, the voltage $V_V$ is substantially equal to $V_{BIAS}$ 401. In one example variable current source 418 conducts a finite second value of current when voltage $V_V$ reaches the first threshold voltage value. Under these conditions, the voltage $V_V$ is reduced since a voltage drop is generated across impedance 481. The change in voltage $V_V$ is dependent on the value of the impedances 481. In one example, if a low resistance values is used for resistor 420, the change in voltage when the sense terminal current 422 is regulated to the second current value is less than an example where a high resistance value is used for resistive element 420.

In the example shown in FIG. 4, if resistive element 420 is replaced with Zener diode 419, the characteristics of the circuit change in that the Zener diode is substantially an open circuit when the voltage across Zener diode 419 is below its rated threshold voltage. When the voltage across Zener diode 419 reaches its rated threshold voltage it presents a very low impedance for any further increase in the voltage across it. As such, in FIG. 4 when a Zener diode 419 is used in place of resistor 420, the voltage $V_V$ 403 shows very little change when variable current source 418 regulates $I_V$ 422 to the second current level in accordance with the teachings of the present invention.

In a practical circuit implementation, variable current source 418 could actually include two current sources that are switched in and out of circuit depending on the value of the voltage $V_V$ according to the description above. The output of voltage sense circuit 410 and response circuit 417 share many aspects with the operation of circuit 100 in FIG. 1 in accordance with the teachings of the present invention.

Figure 5:
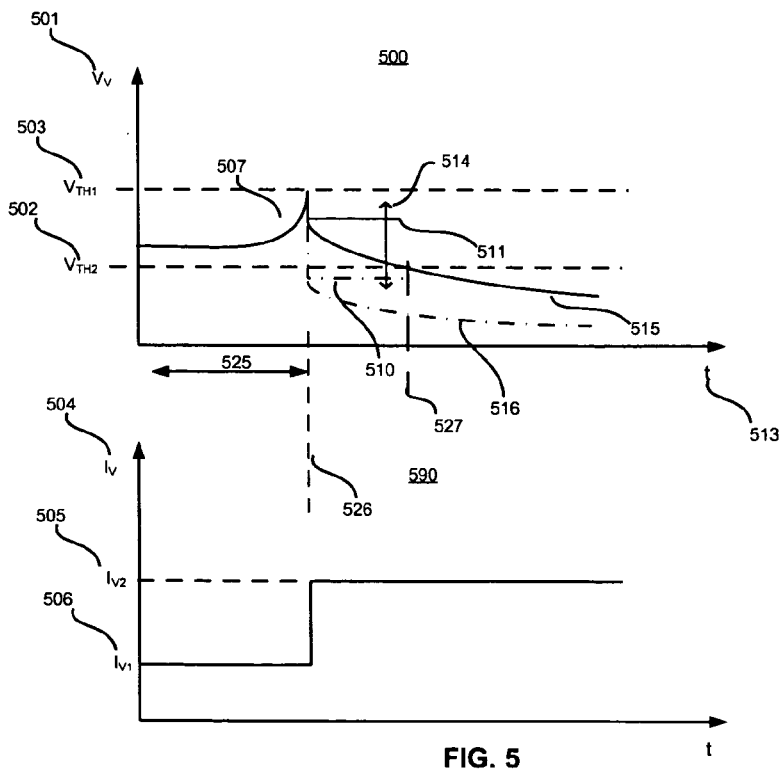
FIG. 5 shows generally waveforms of voltage and current at a sense terminal in accordance with the teachings of the present invention.

FIG. 5 illustrates generally example waveforms in support of the description above of circuit 400. The waveforms of plot 500 show the variation of $V_V$ 501 with time t 513. The waveform of plot 590 shows the variation of $I_V$ 504 with time t 513. For a first period 525, $V_V$ 507 is below a first threshold level $V_{TH1}$ 503. For period 525, $I_V$ 504 is regulated at first current value $I_{V1}$ 506, which in one example could be substantially zero. At time 526, $V_V$ reaches the first threshold level $V_{TH1}$ 503 and $I_V$ 504 is regulated at second current value $I_{V2}$ 505. In the example shown, $I_V$ 504 is regulated at the second current value substantially immediately $V_V$ reaches the first threshold level $V_{TH1}$ 503. In another example the sense terminal could be regulated to the second current value a delay period after $V_V$ reaches the first threshold voltage level $V_{TH1}$ 503. In one example $V_V$ 501 is reduced to a new level 511 that is above a second threshold level $V_{TH2}$ 502. In another example $V_V$ 501 is reduced to a lower new level 510 that is below the second threshold level $V_{TH2}$ 502 indicating that a higher impedance such as resistor 420 is coupled to sense terminal 404 in FIG. 4. Range arrow 514 indicates the range of different voltages $V_V$ 501 that could result when $I_V$ 505 is regulated to the second value $I_{V2}$, depending on the impedance of the circuit coupled to the sense terminal in accordance with the teachings of the present invention.

In one example, controller 406 in FIG. 4 is a power converter controller. In one example an initial response signal 411 is coupled to response circuit 417 to generate an initial response, which for example could be to cease the transfer of energy to an output of the power converter in order to protect the power converter immediately from a fault condition is indicated by the voltage $V_V$ 403 reaching the first threshold level. The initial response signal is therefore independent of the impedance coupled to terminal 404. Plots 515 and 516 in FIG. 5 illustrate example characteristics for voltage $V_V$ 501 over time after an initial response. It is important therefore that a final response generated in response to signal 412 in FIG. 4 is provided before voltage $V_V$ 501 decays too far. In the example of plot 515 in FIG. 5, over time the voltage $V_V$ 501 will decay below $V_{TH2}$ 502 and therefore lead to an incorrect response if sensed after time 527.

Figure 6:
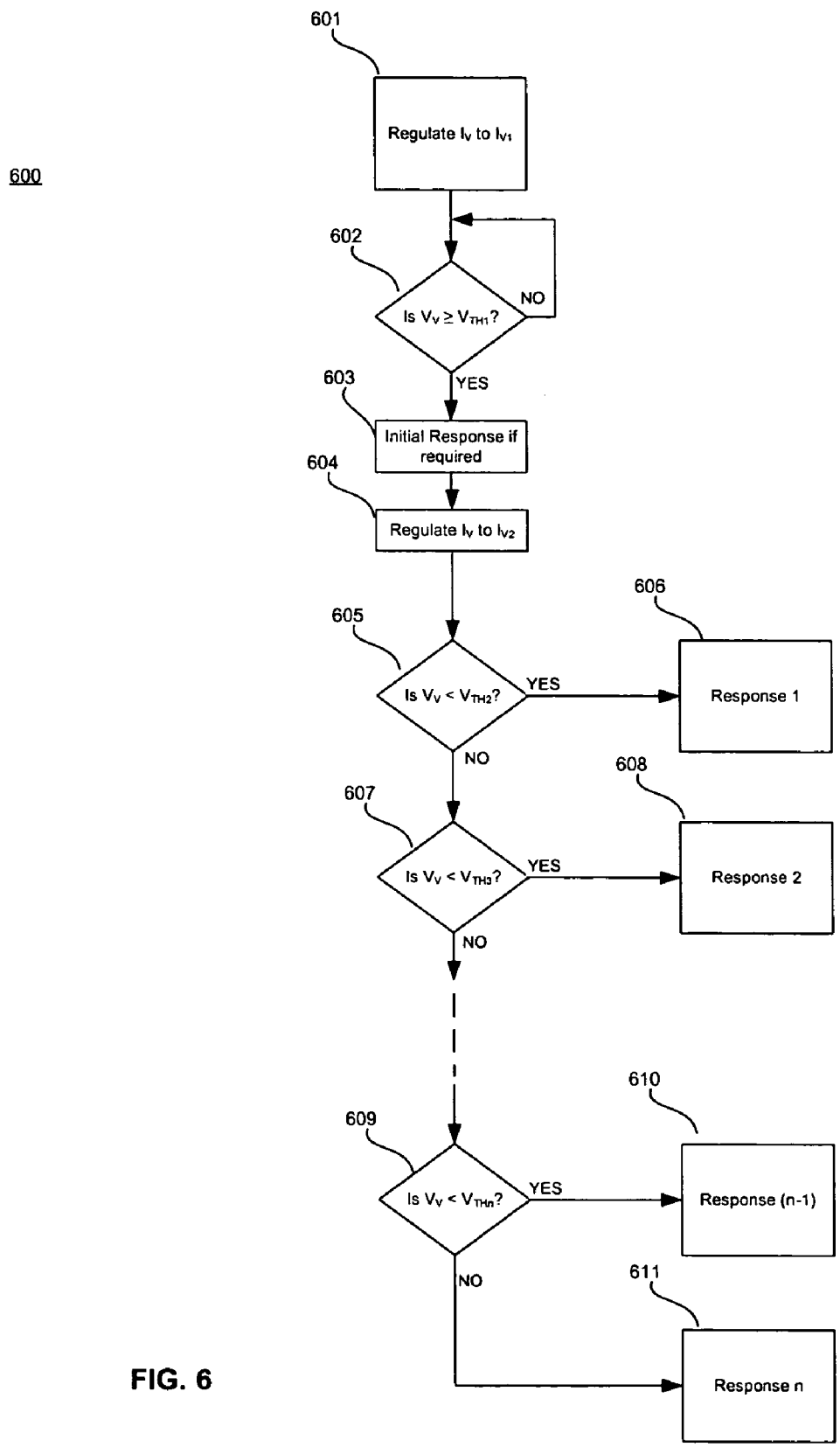
FIG. 6 shows generally an example flowchart for a controller responsive to an impedance coupled to a controller circuit terminal in accordance with the teachings of the present invention.

FIG. 6 shows an example flowchart of the operation of an example controller in accordance with the teachings of the present invention. In block 601, $I_V$ is regulated to the first regulated current value $I_{V1}$. In block 602, the voltage between the sense terminal and a reference potential, $V_V$, is monitored to establish whether it has reached a first threshold value, $V_{TH1}$. When $V_V$ reaches $V_{TH1}$, block 603 implements an initial response if required by the application of the controller. In block 604, $I_V$ is regulated to a second current value $I_{V2}$. In block 605, $V_V$ is compared to a second voltage threshold value $V_{TH2}$. If $V_V$ is less than $V_{TH2}$, block 606 generates a first response output.

In the example flowchart of FIG. 6 a plurality of sense terminal threshold voltage levels are used to compare to the voltage $V_V$ between the sense terminal and reference potential terminal as illustrated in blocks 607 and 609. Where, in block 609, $V_V$ is compared to an nth threshold voltage level $V_{THn}$ generating one of response (n−1) or response n in blocks 610 and 611 respectively. In the flowchart of FIG. 6, the plurality of sense terminal voltage levels are compared to the voltage $V_V$ between the sense terminal and reference potential terminal sequentially. It is understood that in a circuit implementation, the comparisons could be made simultaneously.

Although not shown so as not to obscure the teachings of the present invention, it is also possible to use a plurality of current regulation values to monitor the change in voltage $V_V$ at the sense terminal with each. In this way, the impedance of the circuit coupled to the sense terminal could be characterized over a number of different current regulation thresholds. It is therefore understood that in one example sensing the impedance coupled to the sense terminal comprises detecting the voltage level at the sense terminal at a plurality of currents flowing through the sense terminal.

Figure 7:
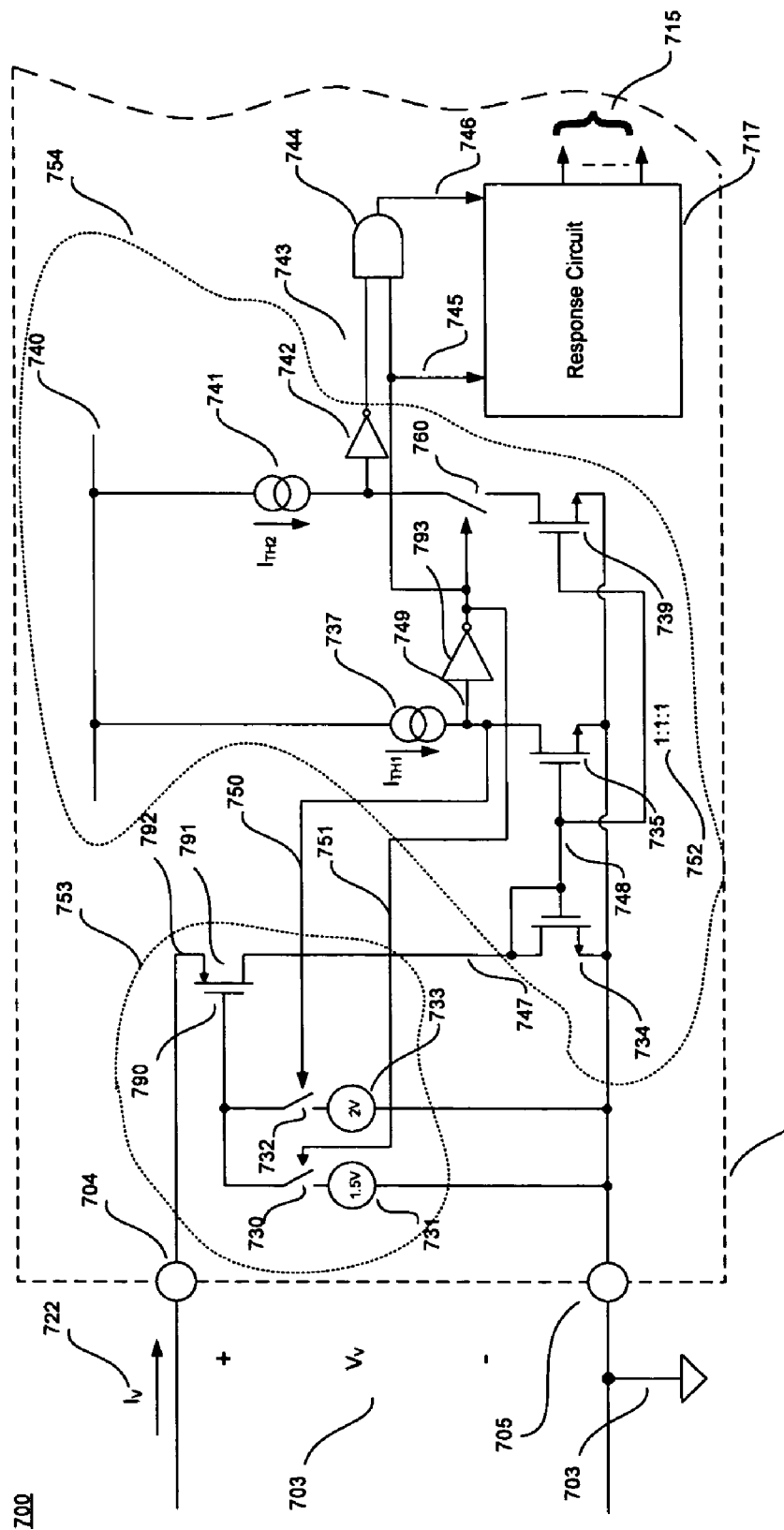
FIG. 7 shows generally an example schematic of a circuit coupled to receive a current flowing through a sense terminal with an example current sense circuit sensing a magnitude of the current flowing through the sense terminal in accordance with the teachings of the present invention.

FIG. 7 is a schematic showing generally a portion of an example controller 738 in accordance with the teachings of the present invention. As shown, the example schematic of FIG. 7 shares many aspects of its operation with the block diagram example shown of FIG. 1. A voltage regulation circuit 753 is coupled to sense terminal 704, which is coupled to receive a current $I_V$ 722. Current sense circuit 754 is coupled to sense the magnitude of the current flowing through sense terminal 704 similar to current sense element 114 in FIG. 1. In one example, the current sense element, which is shown as a separate item 114 in FIG. 1, is included as part of current sense circuit 754 in FIG. 7. Current sense circuit 754 couples signals 745 and 746 to response circuit 717, which in turn couples one or more response signals 715 to a part of the controller 738 not shown so as not to obscure the teachings of the present invention. In one example, signal 745 is an initial response signal that may generate an initial response from response circuit 717 independent of the impedance of circuitry coupled to sense terminal 704.

In the following description, all example voltages are expressed relative to reference potential 703 unless otherwise stated. Under normal operating conditions, switch 732 is closed and voltage source 733 is therefore coupled to apply 2V to the gate 790 of P channel MOSFET 791. In operation, the source 792 of MOSFET 791 is regulated to the value of the voltage at gate 790 plus the threshold voltage of the MOSFET, which is typically in the order of 1 volt for an integrated MOSFET. Since source 792 is coupled to sense terminal 704, the voltage at the sense terminal 704 is therefore regulated as a function of the voltage applied to the gate 790 of MOSFET 791.

As shown in the example, the current flowing through the sense terminal 704 is mirrored from transistor 734 through transistors 735 and 739. In one example, the current mirror including transistors 734, 735 and 739 is a 1 to 1 to 1 current mirror as indicated by the ratios expressed in label 752. In other examples different ratios could be used to step down the sense terminal current to lower values for example to reduce the internal consumption of the controller 738.

In the example, the reflected sense terminal current 722 flowing in transistor 735 is compared to a first threshold current level $I_{TH1}$ 737, supplied from internal supply rail 740, using inverter gate 793. Whenever the sense terminal current 722 is less than $I_{TH1}$ 737, the voltage at node 749 is high. The signal 750 from node 749 is applied to switch 732 to keep it on as described above. If, however, the sense terminal current 722 exceeds $I_{TH1}$ 737, the voltage at node 749 goes low. Switch 732 is turned off and the output signal 751 of inverter gate 793 goes high. The output signal 751 is applied to switch 730, which couples voltage source 731 to gate 790 of MOSFET 791.

In one example, voltage source 731 has a value of 1.5V. Compared to voltage source 733, this results in the voltage at the sense terminal 704 dropping by approximately 0.5 volts. This corresponds to $V_{V2}$ 206 in the example shown in FIG. 2. When output signal 751 of inverter gate 793 goes high, switch 750 is also switched on. The current flowing in transistor 739 is then compared to a second threshold current level $I_{TH2}$ 741 using inverter gate 742. If the current flowing in sense terminal 704 is greater than second threshold current level $I_{TH2}$ 741, then output of inverter gate 742 goes high. The output of logic gate 744 also goes high and signal 746 is applied to response circuit 717 as described with reference to the description of the example circuit and plots of FIG. 1 and FIG. 2.

Figure 8:
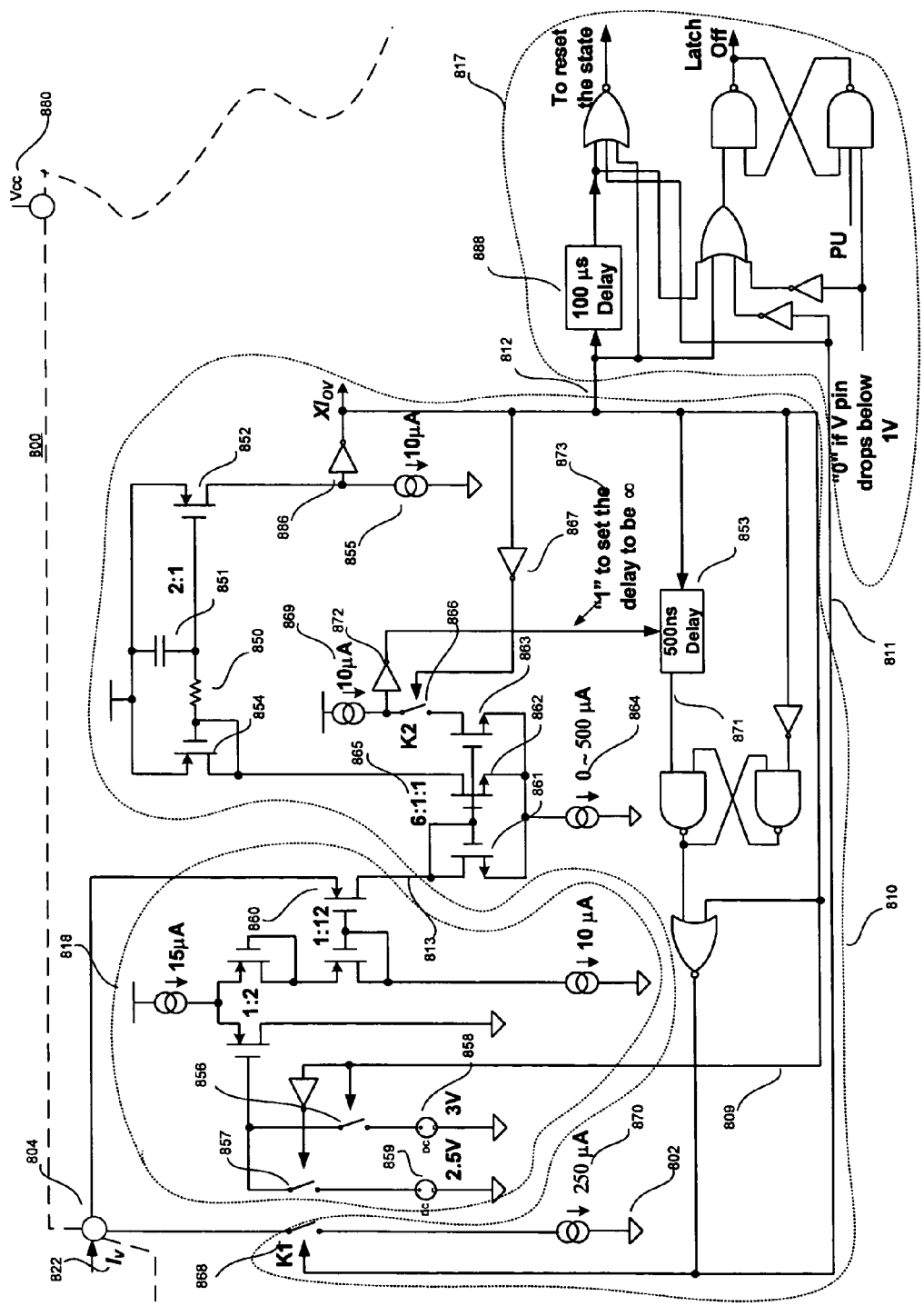
FIG. 8 shows generally an example schematic of a circuit coupled to receive a current flowing through a sense terminal with a current sense circuit sensing a magnitude of the current flowing through the sense terminal in accordance with the teachings of the present invention.

FIG. 8 shows generally a detailed schematic of a portion of an example controller 800 in accordance with the teachings of the present invention. The example circuit shares many aspects of the operation with the example schematic of FIG. 7 described above. In the description below, all example voltages are expressed with reference to reference potential 802 unless otherwise stated.

As shown, response circuit 817 is coupled to sense terminal 804 through the operation of current sense circuit 810 and voltage regulation circuit 818. In the example, the response circuit 817 coupled to be responsive to the impedance of an external circuit coupled to sense terminal 804 when the current 822 flowing through sense terminal 804 exceeds a threshold value. When the current flowing through sense terminal 804 is below the threshold value, switch 856 is closed. The voltage at sense terminal 804 is then regulated to a value substantially equal to the voltage of voltage source 858.

In the example, the circuitry shown in FIG. 8 coupling switch 856 to sense terminal 804 is more complex than the example circuit coupling switch 732 to sense terminal 704 in FIG. 7 in order to remove the influence of switch threshold voltages. However, the operation of this circuitry is not necessary for a controller to benefit from the teachings of the present invention and is therefore not described here so as not to obscure the teachings of the present invention.

Continuing with the example shown in FIG. 8, signal 813 is coupled between voltage regulation circuit 818 and current sense circuit 810 in the way signal 113 in FIG. 1 couples to the current sense circuit 110. The current flowing through sense terminal 804 is mirrored to transistor 862. In one example, the ratio of this current mirror steps the sense terminal current down by a factor of 6 as indicated by label 865, to limit the internal current consumption of controller 800. Current source 864 sets a maximum current level that can flow in transistor 861.

The current flowing in transistor 862 is mirrored through the current mirror made up with transistors 854 and 852. In one example, this current mirror also includes a resistor 850 and capacitor 851 coupled to filter the current flowing in transistor 852 so as to improve noise immunity of the circuit. Current source 855 has a similar function to current source 737 in FIG. 7 and sets the level of a first threshold current.

In operation, if the current flowing through the sense terminal 804 leads to a current flow in transistor 852 that exceeds the current flowing in current source 855 then the output of inverter gate 886 changes from high to low. The signal 809 is coupled to switches 856 and 857 to regulate the voltage level on the sense terminal 804 to be substantially equal to voltage source 859 when the output of inverter gate 886 goes from high to low. In one example, voltage source 859 has a value of 2.5V. In one example, the signal 809 coupled to switches 856 and 857 is the same as signal 812, which couples current sense circuit 810 to response circuit 817 as an indication that the current flowing through sense terminal 804 has exceed a first current threshold level. Signal 812 provides information to response circuit 817 to enable an initial response to the fact that the current flowing through sense terminal 804 has reached the first current threshold level. This signal 812 is therefore applied regardless of the impedance of an external circuit coupled to sense terminal 804.

In one example signal 809 is applied to the input of inverter gate 867, which turns on switch K2 866. In addition, in one example, signal 809 is also applied to delay circuit 853, which couples an output signal 871 to switch K1 868 to an on state when signal 809 goes from high to low for a delay period determined by the output of inverter gate 872 as will be described below. As shown, the circuitry between delay circuit 853 and switch 868 includes a latch, which includes cross-coupled NAND gates coupled to a NOR gate. In one example therefore, switch K1 868 is switched on when the current flowing through sense terminal 804 reaches a first current threshold value determined by the value of current source 855 as described above.

In the example, the current flowing in switch K1 868 is set at the value of current source 870, which in one example is 250 μA. The reason that switch 868 is included in one example is related to the nature of the external circuitry that may be coupled to sense terminal 804. In one example where a Zener diode similar to 119 in FIG. 1 is coupled between the sense terminal 804 and an external bias voltage such as 101 in FIG. 1, the increase in current flowing through sense terminal 804 could increase very significantly when the regulation voltage of sense terminal 804 is changed when switch 856 turns off and switch 857 turns on as described above. Under these conditions, in one example, additional current source 870 is required to ensure transistor 860 in voltage regulation circuit 818 conducts less current to avoid the voltage on sense terminal 804 rising significantly, which would corrupt the impedance measurement that will be performed when the voltage regulation level on sense terminal 804 is set by voltage source 859 in accordance with the teachings of the present invention.

In the example, when switch 866 is on, transistor 863 is directly coupled to current source 869. Current source 869 and current source 870 therefore set the threshold of a second current level, which if exceeded will change the polarity of the output of inverter gate 872 from low to high. As noted by label 873, a high level or '1' output from inverter gate 872 will set the delay period of delay circuit 853 to infinity, which in one example will result in switch 868 being on indefinitely since this condition indicates that the external circuitry coupled to sense terminal 804 has low impedance. If, however, the current flowing in sense terminal 804 is below the second threshold current, then delay circuit 853 turns off switch 868 after a delay period which in one example is 500 nsecs.

In one example, the signal 811, which is used to control switch 868, is also coupled to response circuit 817. In one example signal 811 determines the response of controller 800 dependent on the impedance of the external circuit coupled to sense terminal 804. In one example, if signal 811 remains high for a period longer than the delay period set by delay circuit 888, the controller 800 is latched into an off state, requiring a cycling of power to the controller, which in one example is provided at a Vcc terminal 880, to restart operation. In one example, if signal 811 is low after a delay period set by delay circuit 853, the controller 800 is turned off for a first period of time and is automatically restarted after the first period and turned on for at least a second period of time.

Figure 9:
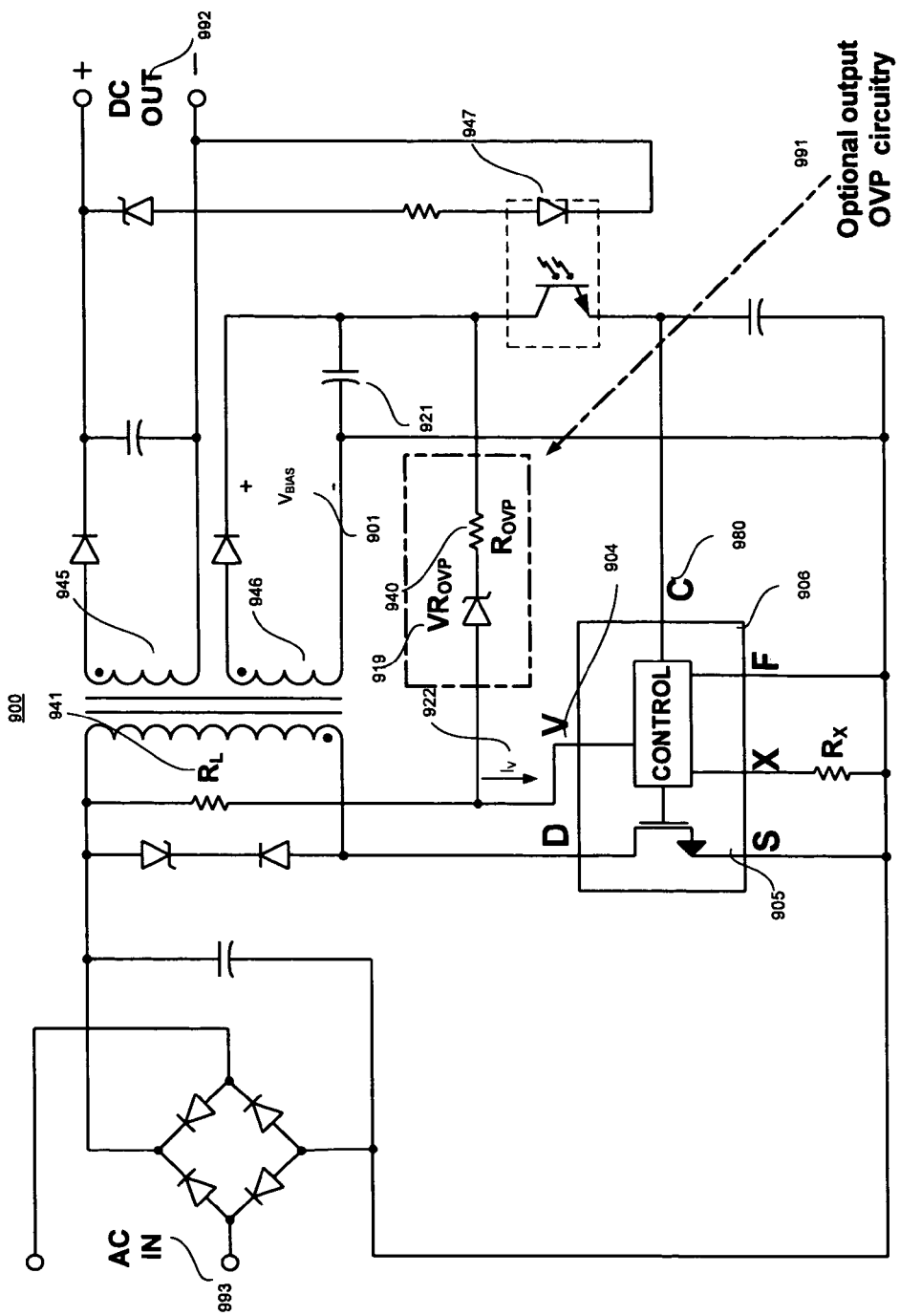
FIG. 9 shows generally an example schematic of a power converter employing a controller comprising a circuit coupled to receive a current flowing through a sense terminal with a current sense circuit sensing a magnitude of the current flowing through the sense terminal in accordance with the teachings of the present invention.

FIG. 9 shows generally an example schematic 900 of an AC to DC power converter circuit employing a controller 906 in accordance with the teachings of the present invention. As shown, the power converter is coupled to receive an AC input voltage 993 and output a DC voltage 992. The example schematic 900 shows a flyback power converter configuration. Bias voltage $V_{BIAS}$ 901 is applied across capacitor 921. An optional output over-voltage protection (OVP) circuit 991 is coupled between capacitor 921 and sense terminal 904 of controller 906.

In the example, a detection circuit 991 is included, which uses a Zener diode 919 similar to Zener diode 119 in FIG. 1. However, in this practical implementation, a resistor 940 is added. In the example, Zener diode 919 is used to isolate the sense terminal 904 from the voltage across capacitor 921 under normal operating conditions. This is necessary since resistor 941 is also coupled to the sense terminal 904 and provides information to the controller 906 regarding the input voltage 993 which would be corrupted by current flowing through OVP circuit 991. The Zener diode 919 only conducts when a fault condition occurs that allows the voltage across capacitor 921 to increase to a level that the Zener threshold voltage of Zener diode 919 is reached. In the example therefore, Zener diode 919 is used regardless of the required response and the resistor 901 value is chosen to determine the type of response required of controller 906. When sense terminal 904 current $I_V$ 922 is below a first threshold current value, the sense terminal 904 is regulated to a first voltage level relative to reference potential terminal 905. When sense terminal current $I_V$ 922 reaches the first threshold value, the sense terminal 904 is regulated to a second voltage level relative to reference potential terminal 905.

In the example, the value of the sense terminal current $I_V$ 922 is detected when the sense terminal 904 is regulated to the second voltage level relative to reference potential terminal 905. The controller 906 is coupled to respond depending on the value of the sense terminal current $I_V$ 922 when the sense terminal 904 is regulated to the second voltage level relative to reference potential terminal 905.

In common with the previous example circuits described above therefore, controller 906 measures an impedance of a circuit coupled to the sense terminal 904 when a magnitude of a current flowing through the sense terminal 904 reaches a threshold value in accordance with the teachings of the present invention. The controller 906 response is then dependent on the measured impedance of the circuit coupled to the sense terminal 904 in accordance with the teachings of the present invention.

In one example, one response could be to shutdown the controller 906 operation such that energy is no longer delivered to power converter output 992 until the AC input voltage 993 is removed allowing controller 906 to reset and restart operation when the AC input voltage 993 is again introduced. In one example, another response could be to shutdown the controller 906 operation such that energy is no longer delivered to power converter output 992 for a period of time and then automatically restart controller 906 operation without it being necessary to remove AC input voltage 993. As the name implies, this over-voltage protection may be used in power converter circuits to protect load circuitry that will be coupled to DC output 992, from being damaged due to a power converter fault condition that leads to the voltage appearing at DC output 992 rising above its normal regulated value.

The option of shutting down controller 906 indefinitely, or a latching shutdown, until AC input voltage 993 is removed and reintroduced or automatically restarting after a shutdown period, normally requires either two separate controller terminals or separate controller designs that must be chosen by the customer, both of which add cost to the manufacture of the controller and power converter.

It will be noted that in the practical implementation of the example shown in FIG. 9, an additional resistor 941 is coupled to the sense terminal 904. In the example, resistor 941 is used to sense an input voltage to the power converter and allow sense terminal 904 to also provide a protection feature called input or line over-voltage shutdown. A single sense terminal 904 can therefore be used to sense over-voltage fault conditions in the AC input voltage 993 as well as sensing output over-voltage fault conditions of output voltage 992 in accordance with the teachings of the present invention. Although the controller 906 therefore also effectively measures the impedance coupled to the sense terminal 904 including this additional resistor 941, the value of the resistor 941 impedance is generally very high compared to that of output OVP circuit 991 and therefore has very little influence on the operation of the controller 906 in accordance with the teachings of the present invention.

Figure 10:
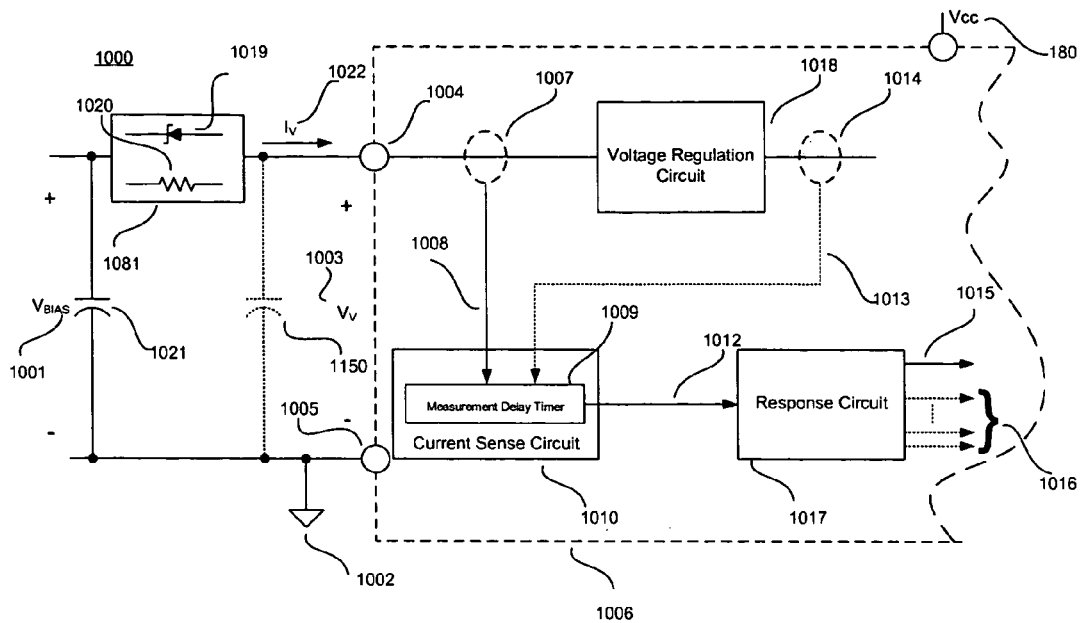
FIG. 10 shows generally an example block diagram of a portion of a controller coupled to receive a current flowing through a sense terminal of the controller with an example current sense circuit sensing a magnitude of the current flowing through the sense terminal in accordance with the teachings of the present invention.

FIG. 10 shows generally a block diagram of an example control circuit being a portion of a controller in accordance with the teachings of the present invention. The example circuit of FIG. 10 shares many aspects of its operation with the example block diagram of FIG. 1. However, the value of the sense terminal voltage $V_V$ 1003 is not regulated to a second voltage level when the current flowing through terminal 1004 exceeds a first threshold value. Instead current sense circuit 1010 includes a timer that times a measurement delay period from the time when the current flowing through terminal 1004 reaches a first threshold value. The current flowing through the sense terminal 1004 is then sensed once the measurement delay is completed. In the example, the signal 1012 to response circuit 1017 is only applied once the measurement delay period is complete. In one example therefore, the initial response signal 111 in FIG. 1 is no longer required in FIG. 10.

In one example where controller 1006 is a power converter controller employed in a power converter circuit, the power supply controller would continue to operate when the current $I_V$ 1022 flowing through sense terminal 1004 reaches the first current threshold level. In an example power converter circuit of the type shown in FIG. 9 for example, the operation described above would lead to the $V_{BIAS}$ 901 voltage continuing to rise when the current $I_V$ flowing in terminal 904 exceeds a first threshold level because the power converter does not implement an initial response and would continue to operate until the measurement delay period is complete.

Figure 11:
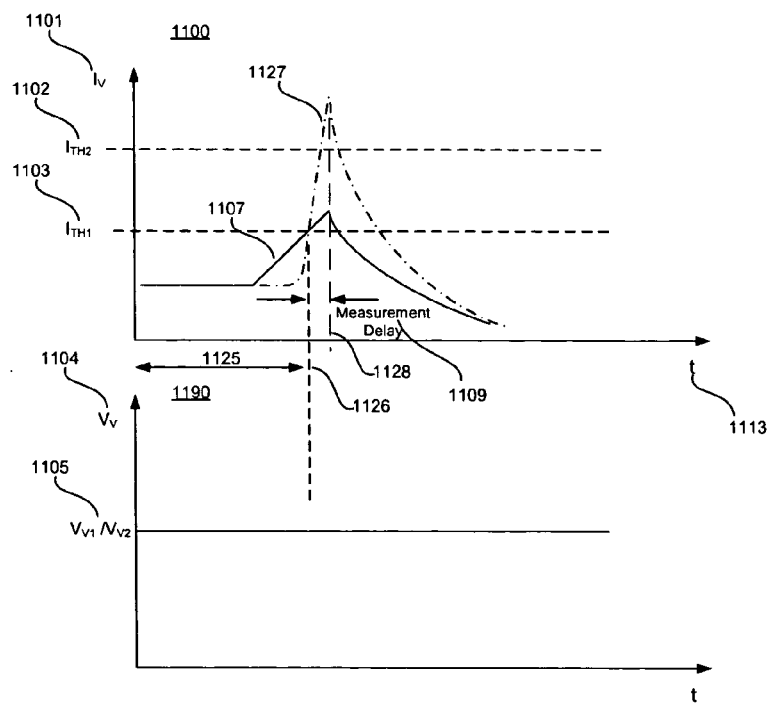
FIG. 11 shows generally waveforms of current and voltage at a sense terminal in accordance with the teachings of the present invention.

FIG. 11 illustrates generally example waveforms in support of the description above of the block diagram in FIG. 10. The waveforms of plot 1100 show the variation of $I_V$ 1101 with time 1113. The waveform of plot 1190 shows the variation of $V_V$ 1104 with time 1113. As shown, for a first period 1125, $I_V$ 1101 is below a first threshold level $I_{TH1}$ 1103. At time 1126, $I_V$ reaches the first threshold level $I_{TH1}$ 1103. In one example, no change is made to $V_V$ 1104, which remains regulated at $V_{V1}$ and therefore $V_{V1}$ and $V_{V2}$ are substantially equal. In one example $I_V$ 1101 continues to rise at a rate dependent on the impedance of the external circuitry coupled to sense terminal 1004 in FIG. 10. After measurement delay period 1109, the current $I_V$ is sensed at time 1128.

In one example shown by plot 1107, $I_V$ at time 1128 is below a second threshold level $I_{TH2}$ 1102, which indicates that impedance block 1081 includes a resistive impedance 1020 in FIG. 10 coupled to sense terminal 1004. In another example shown by plot 1127, $I_V$ 1101 rises to a higher new level that is above a second threshold level $I_{TH2}$ 1102, which indicates that a much lower impedance, such as Zener 1019, is coupled to sense terminal 1004 in FIG. 10. In this way, the impedance of the external circuitry coupled to sense terminal 1004 in FIG. 10 is sensed in accordance with the teachings of the present invention. In one example a capacitor 1150 may be coupled between sense terminal 1004 and reference potential terminal 1005. In one example, capacitor 1150 is used to set up a time constant to influence the characteristic of sense terminal current 1022 over time. The response of controller 1006 is dependent on the value of the measured impedance of the external circuitry coupled to sense terminal 1004 as described with reference to the previously described examples.

Figure 12:
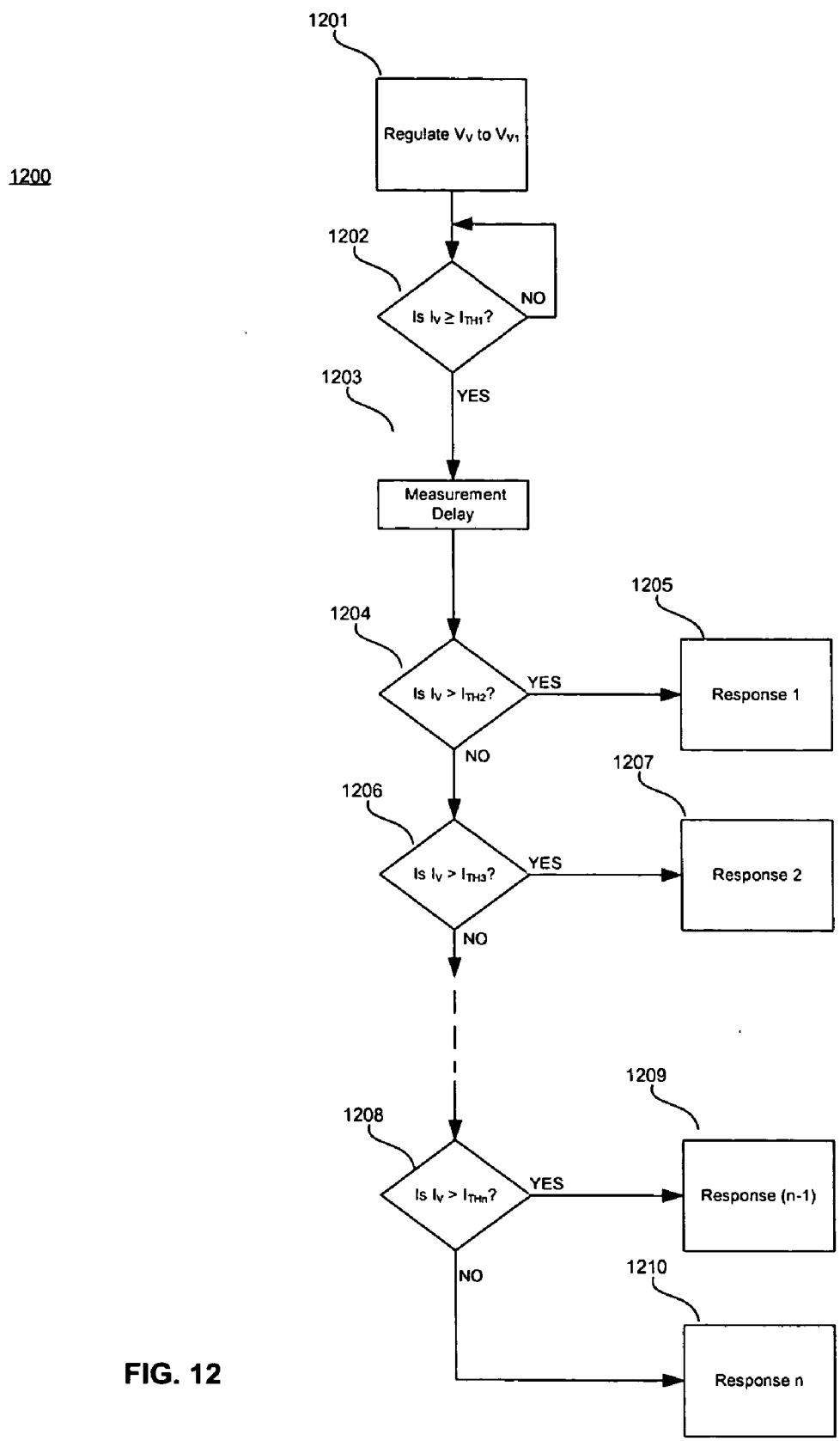
FIG. 12 shows generally an example flowchart for an example controller responsive to an impedance coupled to a controller circuit terminal in accordance with the teachings of the present invention.

FIG. 12 shows generally a flowchart of the operation of an example controller benefiting from the teachings of the present invention as described with reference to FIG. 10 and FIG. 11 above. In block 1201, $V_V$ is regulated to the first regulation voltage level $V_{V1}$. In block 1202 the current flowing in the sense terminal, $I_V$, is monitored to establish whether it is above a first threshold value, $I_{TH1}$. If the current flowing in the sense terminal, $I_V$, reaches $I_{TH1}$, in block 1203 a measurement delay is implemented. In block 1204, $I_V$ is compared to a second current threshold value $I_{TH2}$ once measurement delay period is complete. If $I_V$ is greater than $I_{TH2}$, block 1205 generates a first response.

In the flowchart of FIG. 12 a plurality of sense terminal threshold current levels are used to compare to the current flowing in the sense terminal as illustrated in blocks 1206 and 1208. Where, in block 1208, $I_V$ is compared to an nth threshold current value $I_{THn}$ generating one of response (n−1) or response n in blocks 1209 and 1210 respectively.

Figure 13:
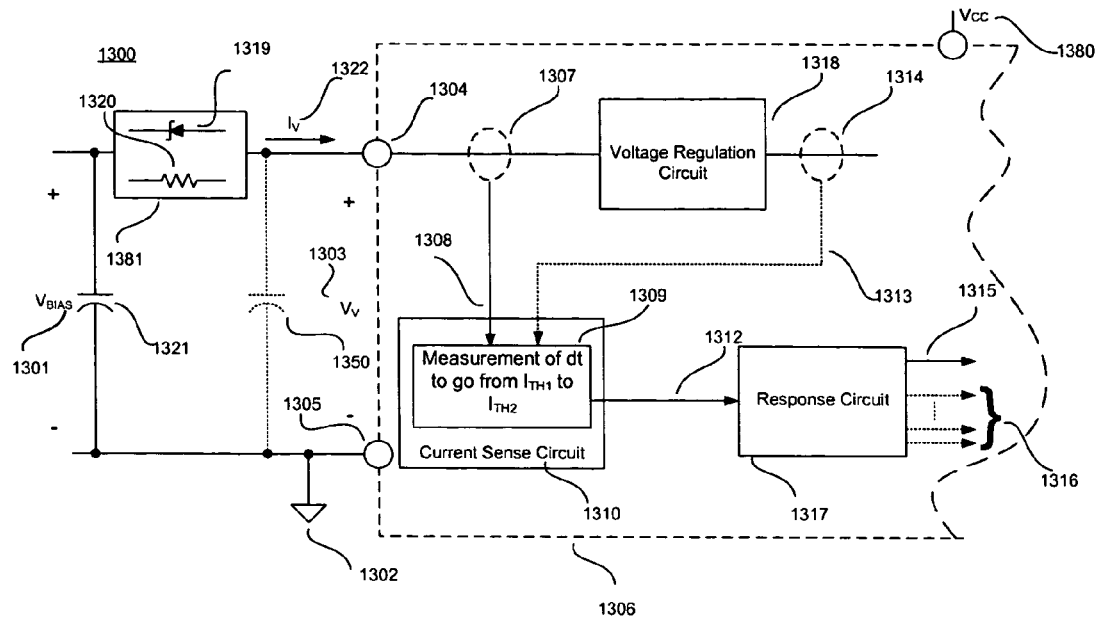
FIG. 13 shows generally an example block diagram of a portion of a controller coupled to receive a current flowing through a sense terminal of the controller with a current sense circuit sensing a magnitude of the current flowing through the sense terminal in accordance with the teachings of the present invention.

FIG. 13 shows generally a block diagram of an example control circuit being a portion of a controller in accordance with the teachings of the present invention. The example circuit shares many aspects of its operation with the example block diagram of FIG. 10. However, current sense circuit 1310 includes a timer that times a delay period, dt, from the time when the current flowing through terminal 1304 reaches a first threshold value to the time the current flowing through terminal 1304 reaches a second threshold value $I_{TH2}$. The delay period is then compared to one or more threshold values to determine the response of response circuit 1317. In the example, the signal 1312 to response circuit 1317 is only applied once the current $I_V$ 1322 flowing through sense terminal 1304 has reached the second threshold value $I_{TH2}$.

In one example where controller 1306 is a power converter controller employed in a power converter circuit, the power supply controller would continue to operate when the current $I_V$ 1322 flowing through sense terminal 1304 exceeds the first current threshold level. In a power converter circuit of the type shown in FIG. 9 for example, the operation described above would lead to the $V_{BIAS}$ 901 voltage continuing to rise when the current $I_V$ flowing in terminal 904 exceeds a first threshold level because the power converter does not implement an initial response and would continue to operate until the current flowing in terminal 904 is greater than a second threshold current value $I_{TH2}$.

Figure 14:
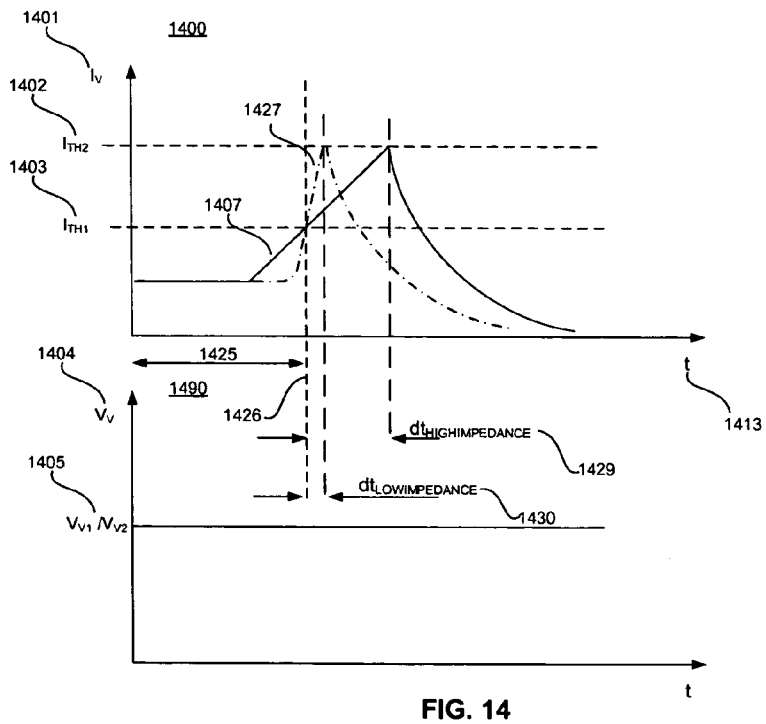
FIG. 14 shows generally waveforms of current and voltage at a sense terminal in accordance with the teachings of the present invention.

FIG. 14 illustrates generally example waveforms in support of the description above of the block diagram in FIG. 13. The waveforms of plot 1400 show the variation of $I_V$ 1401 with time 1413. The waveform of plot 1490 shows the variation of $V_V$ 1404 with time 1413. For a first period 1425, $I_V$ 1401 is below a first threshold level $I_{TH1}$ 1403. At time 1426, $I_V$ reaches the first threshold level $I_{TH1}$ 1403. In one example, no change is made to $V_V$ 1404, which remains regulated at $V_{V1}$ 1405 and therefore $V_{V1}$ and $V_{V2}$ are substantially equal.

In one example $I_V$ 1401 continues to rise at a rate dependent on the impedance of the external circuitry coupled to sense terminal 1304 in FIG. 13. In one example shown by plot 1407, $I_V$ takes a time $dt_{HIGHIMPEDANCE}$ 1429 to reach a second threshold level $I_{TH2}$ 1402 indicating that a high impedance, for example resistive impedance 1320 in FIG. 13 is coupled to sense terminal 1304. In another example shown by plot 1427, $I_V$ takes a shorter time $dt_{LOWIMPEDANCE}$ 1430 to reach a second threshold level $I_{TH2}$ 1402 indicating that a low impedance, such as for example Zener impedance 1319 in FIG. 13 is coupled to sense terminal 1304.

Therefore, the impedance of the external circuitry coupled to sense terminal 1304 in FIG. 13 is sensed in accordance with the teachings of the present invention. In one example capacitor 1350 is used to set up a time constant to influence the characteristic of sense terminal current 1322 over time. The response of controller 1306 is dependent on the value of the measured impedance of the external circuitry coupled to sense terminal 1304 as described with reference to the examples described above.

Figure 15:
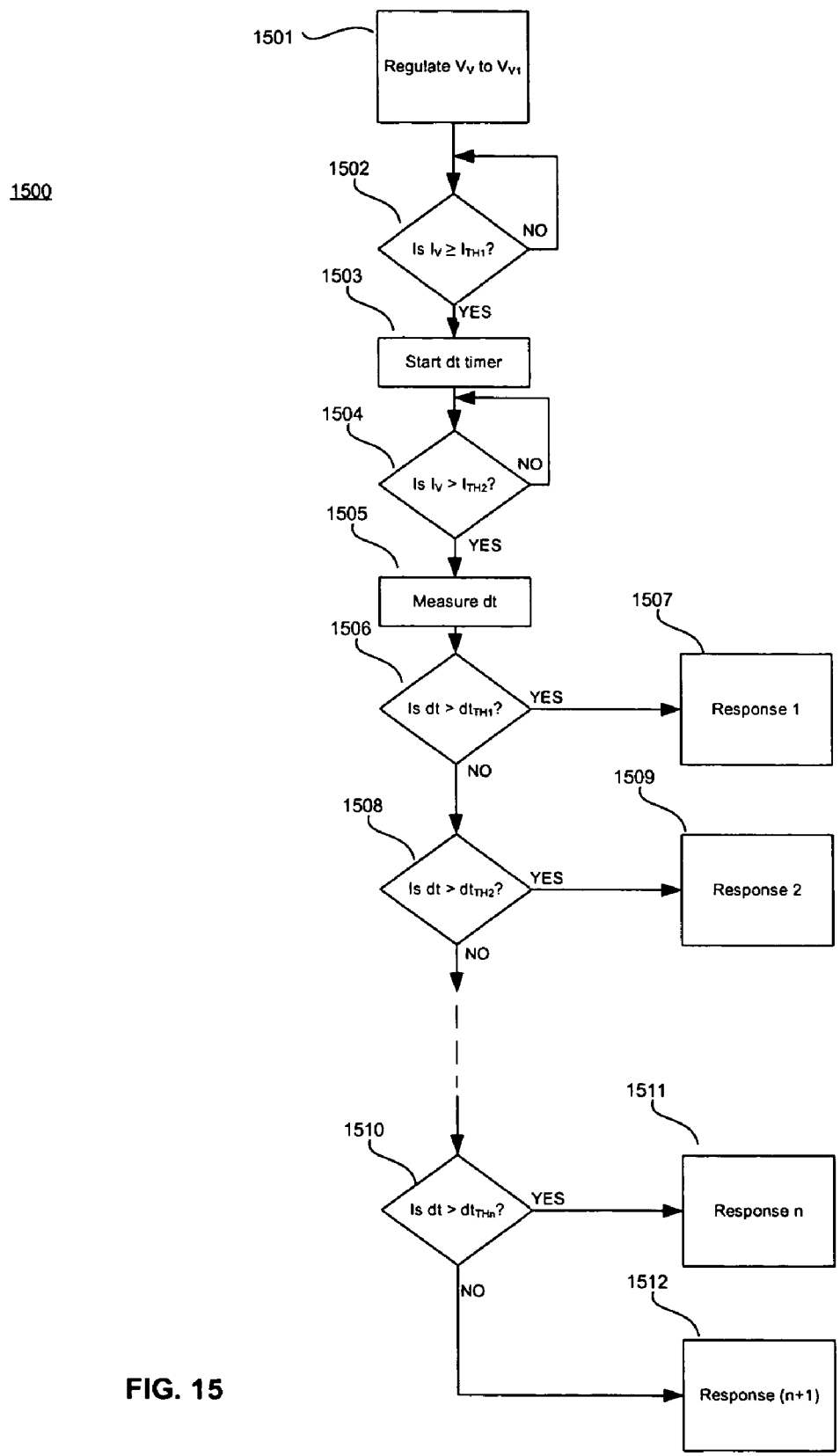
FIG. 15 shows generally an example flowchart for an example controller responsive to an impedance coupled to a controller circuit terminal in accordance with the teachings of the present invention.

FIG. 15 shows generally a flowchart of the operation of a controller in accordance with the teachings of the present invention as described with reference to FIG. 13 and FIG. 14 above. In block 1501, $V_V$ is regulated to the first regulation voltage level $V_{V1}$. In block 1502, the current flowing through the sense terminal, $I_V$, is monitored to establish whether it has reached a first threshold value, $I_{TH1}$. If the current flowing through the sense terminal, $I_V$, reaches $I_{TH1}$, in block 1503 a time measurement is started. In block 1504, $I_V$ is compared to a second current threshold value $I_{TH2}$. If $I_V$ reaches $I_{TH2}$, block 1505 measures the time elapsed, dt, between the current $I_V$ reaching the first threshold current $I_{TH1}$ and reaching the second threshold current level $I_{TH2}$. In block 1506, elapsed time dt is compared to a first time elapse threshold. If elapsed time dt is greater than a first elapsed time threshold $dt_{TH1}$ to generate a first response.

In the flowchart of FIG. 15 a plurality of elapsed time thresholds are used to compare to the measured elapsed time dt, as illustrated in blocks 1508 and 1510. Where, in block 1510, dt is compared to an nth elapsed time threshold $dt_{TH_n}$ generating one of response n or response (n+1) in blocks 1511 and 1512 respectively.

FIGS. 10 to 15 illustrate examples where a current flowing through a sense terminal is sensed to generate a response. In this respect, the example block diagrams of FIG. 10 and FIG. 13 are similar to the example block diagram of FIG. 1. It should be noted, however, that the techniques discussed in FIGS. 10 to 15 are equally applicable to the technique introduced in FIG. 4 where a voltage at a sense terminal is sensed to generate a response. In this case, the first and second current thresholds of FIGS. 10 to 15 would be replaced by first and second voltage thresholds to determine a response to a voltage at a sense terminal exceeding a first threshold voltage level in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply controller, comprising:
a sense circuit coupled to a sense terminal;
a regulation circuit responsive to the sense circuit and coupled to regulate the sense terminal to a first voltage level when a current flowing through the sense terminal is less than a first threshold current level, the regulation circuit further coupled to regulate the sense terminal to a second voltage level when the current flowing through the sense terminal reaches the first threshold current level; and
a response circuit coupled to the sense circuit and responsive to the current flowing through the sense terminal when the sense terminal is regulated at the second voltage level.

2. The power supply controller of claim 1 wherein the sense terminal is regulated to the second voltage level a delay period after the current flowing through the sense terminal reaches the first threshold current level.

3. The power supply controller of claim 1 wherein the second voltage level is less than the first voltage level.

4. The power supply controller of claim 1 wherein the second voltage level is greater than the first voltage level.

5. The power supply controller of claim 1 wherein the second voltage level is substantially equal to the first voltage level.

6. The power supply controller of claim 5 wherein the sense circuit is coupled to sense the current flowing through the sense terminal a measurement delay period after a magnitude of the current flowing through the sense terminal reaches the first threshold current level.

7. The power supply controller of claim 1 wherein the response circuit is coupled to latch off the power supply controller until the power supply controller is reset.

8. The power supply controller of claim 1 wherein the response circuit is coupled to auto restart the power supply controller in response to the sense circuit.

9. The power supply controller of claim 1 wherein the response circuit is coupled to latch off the power supply controller if the current flowing through the sense terminal is greater than a second threshold current level when the sense terminal is regulated at the second voltage level.

10. The power supply controller of claim 1 wherein the response circuit is coupled to auto restart the power supply controller if the current flowing through the sense terminal is less than a second threshold current level when the sense terminal is regulated at the second voltage level.

11. A power supply controller, comprising:
a sense circuit coupled to a sense terminal;
a regulation circuit responsive to the sense circuit and coupled to regulate a current flowing through the sense terminal to a first current value when a voltage at the sense terminal is less than a first threshold voltage level, the regulation circuit further coupled to regulate the current flowing through the sense terminal to a second current value when the voltage at the sense terminal reaches the first threshold voltage level; and
a response circuit coupled to the sense circuit and responsive to the voltage at the sense terminal when the current flowing through the sense terminal is regulated at the second current level.

12. The power supply controller of claim 11 wherein the sense terminal is regulated to the second current value a delay period after the voltage at the sense terminal reaches the first threshold voltage level.

13. The power supply controller of claim 11 wherein the second current level is less than the first current level.

14. The power supply controller of claim 11 wherein the second current level is greater than the first current level.

15. The power supply controller of claim 11 wherein the second current level is substantially equal to the first current level.

16. The power supply controller of claim 15 wherein the sense circuit is coupled to sense the voltage at the sense terminal a measurement delay period after the voltage at the sense terminal reaches the first threshold voltage level.

17. The power supply controller of claim 11 wherein the response circuit is coupled to latch off the power supply controller until the power controller is reset.

18. The power supply controller of claim 11 wherein the response circuit is coupled to auto restart the power supply controller in response to sense circuit.

19. The power supply controller of claim 11 wherein the response circuit is coupled to latch off the power supply controller if the voltage at the sense terminal is greater than a second threshold voltage level when the sense terminal is regulated at the second current level.

20. The power supply controller of claim 11 wherein the response circuit is coupled to auto restart the power supply controller if the voltage at the sense terminal is less than a second threshold voltage level when the sense terminal is regulated at the second current level.

21. A power supply controller, comprising:
a sense circuit coupled to a sense terminal;
a timing circuit coupled to measure a period of time taken for a current flowing through the sense terminal to change from a first threshold current level to a second threshold current level once the first current threshold level is reached; and
a response circuit coupled to the sense circuit and responsive to the period of time taken for the current flowing through the sense terminal to change from the first threshold current level to the second threshold current level.

22. The power supply controller of claim 21 wherein the response circuit is coupled to latch off the power supply controller until the power supply controller is reset.

23. The power supply controller of claim 21 wherein the response circuit is coupled to auto restart the power supply controller in response to sense circuit.

24. The power supply controller of claim 21 wherein the response circuit is coupled to latch off the power supply controller if the period of time taken for the current flowing through the sense terminal to change from a first threshold current level to a second threshold current level is less than a threshold time period.

25. The power supply controller of claim 21 wherein the response circuit is coupled to auto restart the power supply controller if the period of time taken for the current flowing through the sense terminal to change from a first threshold current level to a second threshold current level is greater than a threshold time period.

26. A method for controlling a power supply, comprising:
sensing a sense terminal of a power supply controller;
regulating the sense terminal, responsive to the sensing of the sense terminal, to a first voltage level when a current flowing through the sense terminal is less than a first threshold current level;
measuring an impedance coupled to the sense terminal when the current flowing through the sense terminal reaches the first threshold current level; and
generating a power supply controller response in response to the impedance coupled to the sense terminal.

27. The method of claim 26 wherein measuring the impedance coupled to the sense terminal comprises detecting the current flowing through the sense terminal at a plurality of voltage levels on the sense terminal.

28. A method for controlling a power supply, comprising:
sensing a sense terminal of a power supply controller;
regulating a current flowing through the sense terminal, responsive to the sensing of the sense terminal, to a first current value when a voltage at the sense terminal is less than a first threshold voltage level;
measuring an impedance coupled to the sense terminal when the voltage at the sense terminal reaches the first threshold voltage level; and
generating a power supply controller response in response to the impedance coupled to the sense terminal.

29. The method of claim 28 wherein measuring the impedance coupled to the sense terminal comprises detecting the voltage level at the sense terminal at a plurality of currents flowing through the sense terminal.

30. A method for controlling a power supply, comprising:
sensing a sense terminal of a power supply controller;
measuring a period of time taken for a current flowing through the sense terminal to change from a first threshold current level to a second threshold current level once the first current threshold level is reached;
generating a power supply controller response in response to the period of time taken for the current flowing through the sense terminal to change from the first threshold current level to the second threshold current level.

* * * * *